UNITED STATES PATENT OFFICE 1,972,561

TREATMENT OF PLANT JUICES

Ulrich Heubaum, Urbana, Ill., assignor to Board of Trustees of The University of Illinois, Urbana, Ill., a corporation of Illinois No Drawing. Application March 12, 1932, Serial No. 598,537

12 Claims. (Cl. 204—1)

This invention relates to the hydrolysis of plant juices that contain polysaccharides and more particularly to a method of creating the necessary acidity for the hydrolysis and the subsequent neutralization of the hydrolyzed juice. This process can be successfully applied to the preparation of various kinds of sugar syrups. It enables their production without the use of foreign chemicals.

This invention makes possible a hydrolysis of plant juices as specified above, avoiding the addition of any acid to the juice. The acidity is created by subjecting the juice to the action of direct electric current in an apparatus which is separated into two or three compartments by one or two suitable diaphragms. The cations of the salts which are naturally present in the juice will be eliminated by electrodialysis while the anions remain in the juice.

Other and further aspects of this invention will be apparent from the disclosures in the specification and the appended claims.

In order to hydrolyze plant juices that contain saccharine material it has been customary hitherto to add an inorganic or organic acid to the juice and to carry out the hydrolysis at temperatures either below or above 100° C. The acid may be removed after hydrolysis with a suitable cation or it remains in the juice mostly as soluble sodium salt, thus increasing the ash content of the final syrup. Since a high salt content is objectionable to the taste, a removal of the acid added for hydrolysis is necessary. The precipitation process, as, for instance, with lime if sulphuric acid was applied, requires the consumption of chemicals and special filtering equipment which increase the cost of the final product.

I have found that the acidity necessary for the hydrolysis of plant juices as specified above may be produced by electrolyzing said juices between suitable diaphragms. Plant juices contain acids chiefly in the form of potassium salts. The potassium ion has a relatively high migration velocity as compared with the slow moving organic anions. It, therefore, will carry the major portion of the current. The electrolysis is carried out in an apparatus which is separated into three compartments by two permeable diaphragms, the juice being in the middle compartment and the electrodes in the outer compartments immersed in water. Under the action of direct electric current the cations will leave the middle compartment faster than the anions. The anions will be accumulated at the anode diaphragm and the fast moving $OH^-$ ions of the water will take the transportation of the current from the anode diaphragm to the anode. An equivalent number of $H^+$ ions will be produced at the anode diaphragm in the middle compartment, thus creating the desired acidity. This effect may be increased by choosing diaphragms with a distinct electric charge. Diaphragms which are negatively charged are preferred, because they are quite permeable to cations while they hinder the migration of the anions. This kind of diaphragm may be prepared from vegetable material. Diaphragms formed of tightly woven canvas impregnated with a solution of viscose and then washed in dilute sulphuric acid are suitable. Under such conditions the plant juice can be quite readily acidified to a pH of 3, or even lower. It may then be treated by any method of hydrolysis known in the sugar industry.

The acidification of the juice may also be carried out in certain cases in the anode compartment of a two-compartment apparatus.

After the acidified juice has been hydrolyzed it can be neutralized by sodium bicarbonate, sodium carbonate or sodium hydroxide. By this method of neutralization the objectionable taste of the potassium salts originally present in the juice is eliminated, the potassium being at least partially replaced by sodium.

Instead of adding chemicals to produce neutralization the neutralization may be carried out by means of the electrical current. The hydrolyzed juice is filled into the central compartment of a three compartment cell and electrolyzed between suitable diaphragms, the character of the diaphragms being such that they offer a low resistance to the anions. This can be attained by using diaphragms with a distinct positive charge, as, for instance, a leather diaphragm, or a diaphragm of lamb's hide tanned with quinone.

In a sense this neutralization may be regarded as a reversal of the acidification process in that the removal of anions decreases the acidity, while in the other case the removal of the cations increases the acidity.

The neutralization may also be carried out in the cathode compartment of a two-compartment cell. The diaphragm separating the anode from the cathode compartment is similar to the one applied in the neutralization method described above.

In these two latter methods of neutralization the ash content of the syrup is even further reduced.

Without limiting my invention to any particular procedure, the following examples will serve to illustrate my method:

(1) Preparation of levulose syrup from Jerusalem artichokes

One liter of juice as obtained by the extraction of dried Jerusalem artichoke chips containing about 20% inulin is filled into the central compartment of a three-compartment cell. The cross-section of the apparatus was approximately 1 square decimeter and the distance between the two membranes 18 centimeters. The electrodes are graphite and are placed in the outer compartments about 5 millimeters from the diaphragms. Both diaphragms are made from canvas. With the juice and its accompanying impurities in the central compartment and the electrodes immersed in water, the current is turned on and the voltage regulated so that a current density of about 1 amp. per square decimeter is maintained. This requires a potential of about 1 to 5 volts per centimeter, varying with the conductivity of the juice. While the cell is in operation, a slow stream of water is allowed to flow through the electrode compartments. The fresh water is added at the bottom of the compartments, between the electrodes and the membrane.

The juice in the middle compartment rapidly becomes acid; at the same time a considerable flocculation of colloidal material takes place. After a pH of 3 is reached the juice is hydrolyzed at 125° for 40 minutes. It is then filtered through charcoal, neutralized with sodium hydroxide, and concentrated. The resulting syrup is very sweet and has no salty taste.

(2) Inversion of potato starch

Raw potatoes are mashed and filled into the anode compartment of a two-compartment apparatus. After having obtained a pH of three the juice is hydrolyzed with pressure by heating to 135° C. After bonechar treatment the neutralization is carried out in the cathode compartment of the same apparatus.

(3) Preparation of beet syrup

In the manufacture of beet or cane syrup a partial inversion of the sucrose is necessary in order to prevent crystallization. The inversion has most easily been attained in the manner described under (1).

I am aware that many changes may be made and numerous details of the process and the apparatus may be varied through a wide range without departing from the principle of this invention, and I therefore do not propose limiting the patent granted hereon, otherwise than necessitated by the prior art.

I claim as my invention:

1. In the making of syrup, the process of preparing plant juices for hydrolysis, which includes the step of acidifying the juices by decreasing the cations by electrodialysis while maintaining the anion concentration substantially unreduced.

2. The process of making syrup from plant juices which comprises acidifying the juices by decreasing the cations by electrodialysis, hydrolyzing the acidified juices, and then decreasing the acidity of the juice.

3. The process of making syrup from plant juices which comprises acidifying the juices by decreasing the cations by electrodialysis, hydrolyzing the acidified juices, and then decreasing the acidity of the juices by decreasing the anions by electrodialysis.

4. The process of treating plant juices containing polysaccharides, which comprises electrolyzing the juice in the central compartment of a three compartment cell separated from the electrodes by semi-permeable diaphragms which possess a negative charge, hydrolyzing said juice, and neutralizing the hydrolyzed juice by electrolysis through diaphragms possessing a positive charge.

5. The process of making syrup which comprises, extracting plant juices containing polysaccharides and a salt of an alkali metal, acidifying the juice by removing therefrom some of the alkali metal by electrodialysis without introducing any substantial amount of foreign matter, then hydrolyzing the acidified juice and neutralizing at least a portion of the acidity.

6. The process of making syrup which comprises extracting plant juices containing polysaccharides and a salt of an alkali metal, removing some of the alkali metal and reducing the pH of the juice to approximately 3 by electrodialysis, hydrolyzing the acidified juice, and then increasing the pH of the juice.

7. The process of making a sweet liquid which comprises, extracting plant juices containing polysaccharides and a potassium salt, acidifying the juices by removing the potassium ion by electrodialysis, then hydrolyzing the acidified juice, and then neutralizing the acidity.

8. The process of making syrup which comprises extracting plant juices containing polysaccharides and a potassium salt, acidifying the juice by electrodialysis, hydrolyzing it, and then neutralizing at least a portion of the acidity, characterized in that, some of the changing of the pH of the liquid is accomplished by removing some of the potassium in one stage of operation and replacing it by sodium during some other stage of the process.

9. The process of making syrup which comprises, extracting juice from Jerusalem artichokes, acidifying the juice by removing the potassium ion by electrodialysis, then hydrolyzing the acidified juice, then neutralizing the hydrolyzed juice.

10. The process of making syrup from plant juices which comprises acidifying the juices by decreasing the cations by electrodialysis while maintaining the anion concentration substantially unreduced, and then hydrolyzing the acidified juices.

11. The process of making syrup from plant juices which comprises acidifying the juices through the removal of at least a part of the cations contained therein by causing their migration, under an electrical potential, through electro-negative diaphragms which do not allow an equal migration of anions, hydrolyzing the acidified juices, decreasing the acidity through the removal of the required amount of the anions contained therein by causing their migration, under an electrical potential, through electro-positive diaphragms which do not allow an equal migration of cations, and concentrating the juices.

12. The process of treating plant juices which comprises acidifying the juice to a desired pH value by electrodialysis, then hydrolyzing the juice, and then neutralizing the hydrolyzed juice by electrodialysis.

ULRICH HEUBAUM.